(12) United States Patent
Jeong et al.

(10) Patent No.: US 11,205,442 B2
(45) Date of Patent: *Dec. 21, 2021

(54) METHOD AND APPARATUS FOR RECOGNITION OF SOUND EVENTS BASED ON CONVOLUTIONAL NEURAL NETWORK

(71) Applicant: Electronics and Telecommunications Research Institute, Daejeon (KR)

(72) Inventors: Young Ho Jeong, Daejeon (KR); Sang Won Suh, Daejeon (KR); Tae Jin Lee, Daejeon (KR); Woo-taek Lim, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 124 days.

This patent is subject to a terminal disclaimer.

(21) Appl. No.: 16/562,110

(22) Filed: Sep. 5, 2019

(65) Prior Publication Data

US 2020/0302949 A1 Sep. 24, 2020

(30) Foreign Application Priority Data

Mar. 18, 2019 (KR) .................. 10-2019-0030483

(51) Int. Cl.
| | |
|---|---|
| *G10L 15/14* | (2006.01) |
| *G06N 3/04* | (2006.01) |
| *G10L 25/30* | (2013.01) |
| *G10L 25/84* | (2013.01) |
| *G10L 17/04* | (2013.01) |

(52) U.S. Cl.
CPC ............. *G10L 25/30* (2013.01); *G06N 3/04* (2013.01); *G10L 15/144* (2013.01); *G10L 17/04* (2013.01); *G10L 25/84* (2013.01)

(58) Field of Classification Search
CPC ....... G10L 25/30; G10L 15/144; G10L 17/04; G10L 25/84; G06N 3/04
See application file for complete search history.

(56) References Cited

U.S. PATENT DOCUMENTS

| | | | |
|---|---|---|---|
| 9,378,733 B1 | 6/2016 | Vanhoucke et al. | |
| 2013/0226850 A1* | 8/2013 | Hannuksela | ........... G10L 25/48 706/14 |

(Continued)

FOREIGN PATENT DOCUMENTS

| | | |
|---|---|---|
| KR | 101749254 B1 | 6/2017 |
| KR | 1020170088165 A | 8/2017 |

(Continued)

OTHER PUBLICATIONS

Valenti , A Convolutional Neural Network Approach for Acoustic Scene Classification, 2017, IEEE, p. 1547-1550 (Year: 2017).*

(Continued)

*Primary Examiner* — Sonia L Gay
(74) *Attorney, Agent, or Firm* — William Park & Associates Ltd.

(57) ABSTRACT

Provided is a sound event recognition method that may improve a sound event recognition performance using a correlation between difference sound signal feature parameters based on a neural network, in detail, that may extract a sound signal feature parameter from a sound signal including a sound event, and recognize the sound event included in the sound signal by applying a convolutional neural network (CNN) trained using the sound signal feature parameter.

14 Claims, 8 Drawing Sheets

(56) References Cited

U.S. PATENT DOCUMENTS

| | | |
|---|---|---|
| 2016/0078863 A1 | 3/2016 | Chung et al. |
| 2016/0260426 A1 | 9/2016 | Kim et al. |
| 2017/0206894 A1 | 7/2017 | Kang et al. |
| 2018/0075844 A1 | 3/2018 | Kim et al. |
| 2018/0174575 A1 | 6/2018 | Bengio et al. |
| 2019/0049989 A1 | 2/2019 | Akotkar et al. |
| 2019/0130894 A1* | 5/2019 | Jin .................. G10L 13/04 |
| 2019/0259378 A1* | 8/2019 | Khadloya ............ G10L 25/18 |

FOREIGN PATENT DOCUMENTS

| | | | |
|---|---|---|---|
| KR | 1020170095582 A | 8/2017 | |
| KR | 1020180084464 A | 7/2018 | |
| KR | 1020180122171 A | 11/2018 | |
| WO | WO-2014108890 A1 * | 7/2014 | ............ G10L 15/02 |
| WO | 2014196836 A1 | 12/2014 | |

OTHER PUBLICATIONS

Ren, Deep Sequential Image Feature for Acoustic Scene Classificatio, 2017, DECASE (Year: 2017).*

Huzaifah, Comparison of Time Frequency Represntations for Environmental Sound Clasification using Convolutional Newural Networks, 2017, arCiv (Year: 2017).*

Janicki, An assessment of automatic speaker verification vulnerabilites to replay spoofing attacks, 2016, Security and Communication Network (Year: 2016).*

* cited by examiner

METHOD AND APPARATUS FOR RECOGNITION OF SOUND EVENTS BASED ON CONVOLUTIONAL NEURAL NETWORK

CROSS-REFERENCE TO RELATED APPLICATION(S)

This application claims the benefit of Korean Patent Application No. 10-2019-0030483, filed on Mar. 18, 2019, in the Korean Intellectual Property Office, the disclosure of which is incorporated herein by reference.

BACKGROUND

1. Field of the Invention

One or more example embodiments relate to a convolutional neural network (CNN) based sound event recognition method and apparatus, and more particularly, to a sound signal feature parameter of a three-dimensional structure capable of training with respect to a correlation between different sound signal feature parameters.

2. Description of the Related Art

Recently, sound recognition technology has been applied to various fields such as facility surveillance, dangerous situation recognition, place recognition, and multimedia event sensing. There are various sound events such as a scream, a honk, a baby crying, a crashing sound, a dog barking, and a thunderclap. In particular, the sound recognition technology is necessarily needed for the elderly and the infirm with weak hearing or the hearing-impaired to effectively avoid a dangerous situation which may not be visually perceived.

The sound recognition technology includes a sound event recognition and a sound scene recognition depending a recognition target. A sound event refers to a sound entity which appears at a predetermined time and disappears, such as a scream, or a dog barking, and a sound scene refers to a set of sound events that may appear at a predetermined location such as a restaurant, an office, a house, or a park. Thus, the sound scene recognition exhibits a relatively high recognition performance, when compared to the sound event recognition.

Further, the sound event recognition technology includes a monophonic sound event recognition and a polyphonic sound event recognition depending on a number of events to be recognized at the same time. The monophonic sound event recognition provides only a result of recognizing a single sound event at a corresponding point in time, whereas the polyphonic sound event recognition provides a result of recognizing a plurality of sound events at a corresponding point in time. In many of the application fields, a demand for the polyphonic sound event recognition technology is high.

In a neural network based sound event recognition, in general, an audio waveform or one of sound signal feature parameters is used as an input. When an audio waveform is used as an input, a neural network performs feature extraction and event recognition at the same time, without performing signal pre-processing for separate feature extraction. However, such an end-to-end neural network has a relatively high model complexity when compared to a neural network which uses a sound signal feature parameter as an input and thus, requires more time for training, and exhibits a low performance when sufficient training data is not secured. A sound signal feature parameter based neural network representatively uses a log Mel-filter bank energy as an input. However, in many cases, a log Mel-filter bank energy feature parameter converted for a monophonic sound signal is used as an input, or two log Mel-filter bank energy feature parameters converted for a stereoscopic signal are concatenated and used as an input.

As described above, when feature parameters are concatenated and used as an input, the entire neural network may not be trained with respect to a correlation between the feature parameters, and thus correlation information may not be sufficiently utilized for a sound event recognition.

SUMMARY

An aspect provides a sound event recognition method that may improve a sound even recognition performance using a correlation between different sound signal feature parameters based on a neural network.

Another aspect also provides a sound event recognition method that may use feature parameters of a three-dimensional structure generated through signal processing of different sound signal feature parameters, as an input for a neural network.

According to an aspect, there is provided a method for recognition of sound events based on a convolutional neural network (CNN), the method including identifying a sound signal including a sound event, extracting at least one sound signal feature parameter from the sound signal, and recognizing the sound event included in the sound signal by applying a CNN trained using the extracted at least one sound signal feature parameter, wherein the CNN may be trained through a first hidden layer including at least one feature map generated by normalizing the extracted at least one sound signal feature parameter.

The at least one sound signal feature parameter may be a scalogram which divides the identified sound signal into preset frame units, and applies a discrete wavelet transform (DWT) to the frame units.

The at least one sound signal feature parameter may be a log spectrogram which divides the identified sound signal into preset frame units, and applies a log to a result of discrete Fourier transform (DFT) after applying windowing to the frame units.

The log spectrogram may have a trade-off relationship between a frequency resolution and a time resolution based on a length of the windowing.

The at least one sound signal feature parameter may be a log Mel-filter bank energy which divides the identified sound signal into preset frame units, and applies a Mel-filter bank and a log to a result of DFT after applying windowing to the frame units, and the Mel-filter bank may apply a Mel scale to the result of DFT in view of a different resolution depending on a frequency.

The at least one sound signal feature parameter may be a cepstrogram derived using a discrete cosine transform (DCT) coefficient derived by applying DCT to the log Mel-filter bank energy, a delta coefficient, and a delta-delta coefficient.

The number of components of a remaining sound signal feature parameter may be adjusted based on the number of components of a sound signal feature parameter preset for a frame interval to which the windowing is applied.

According to an aspect, there is provided a method of training a CNN to be applied to a sound event recognition method, the method including normalizing at least one sound signal feature parameter extracted from a sound signal including a sound event, and training a CNN through a first hidden layer including at least one feature map generated based on the normalized sound signal feature parameter.

The at least one sound signal feature parameter may include i) a scalogram which divides the identified sound signal into preset frame units, and applies a DWT to the frame units, ii) a log spectrogram which divides the identified sound signal into preset frame units, and applies a log to a result of DFT after applying windowing to the frame units, iii) a log Mel-filter bank energy which divides the identified sound signal into preset frame units, and applies a Mel-filter bank and a log to a result of DFT after applying windowing to the frame units, and iv) a cepstrogram derived using a DCT coefficient derived by applying DCT to the log Mel-filter bank energy, a delta coefficient, and a delta-delta coefficient.

The number of components of a remaining sound signal feature parameter may be adjusted based on the number of components of a sound signal feature parameter preset for a frame interval to which the windowing is applied.

According to an aspect, there is provided a sound event recognition apparatus to which a CNN is applied, the sound event recognition apparatus including a processor and a memory including computer-readable instructions, wherein, when the instructions are executed by the processor, the processor may be configured to identify a sound signal including a sound event, extract at least one sound signal feature parameter from the sound signal, and recognize the sound event included in the sound signal by applying a CNN trained using the extracted at least one sound signal feature parameter, and wherein the CNN may be trained through a first hidden layer including at least one feature map generated by normalizing the extracted at least one sound signal feature parameter.

The at least one sound signal feature parameter may be a scalogram which divides the identified sound signal into preset frame units, and applies a DWT to the frame units.

The at least one sound signal feature parameter may be a log spectrogram which divides the identified sound signal into preset frame units, and applies a log to a result of DFT after applying windowing to the frame units.

The log spectrogram may have a trade-off relationship between a frequency resolution and a time resolution based on a length of the windowing.

The at least one sound signal feature parameter may be a log Mel-filter bank energy which divides the identified sound signal into preset frame units, and applies a Mel-filter bank and a log to a result of DFT after applying windowing to the frame units, and the Mel-filter bank may apply a Mel scale to the result of DFT in view of a different resolution depending on a frequency.

The at least one sound signal feature parameter may be a cepstrogram derived using a DCT coefficient derived by applying DCT to the log Mel-filter bank energy, a delta coefficient, and a delta-delta coefficient.

The number of components of a remaining sound signal feature parameter may be adjusted based on the number of components of a sound signal feature parameter preset for a frame interval to which the windowing is applied.

According to an aspect, there is provided an apparatus for training a CNN to be applied to a sound event recognition method, the apparatus including a processor and a memory including computer-readable instructions, wherein, when the instructions are executed by the processor, the processor may be configured to normalize at least one sound signal feature parameter extracted from a sound signal including a sound event, and train a CNN through a first hidden layer including at least one feature map generated based on the normalized sound signal feature parameter.

The at least one sound signal feature parameter may include i) a scalogram which divides the identified sound signal into preset frame units, and applies a DWT to the frame units, ii) a log spectrogram which divides the identified sound signal into preset frame units, and applies a log to a result of DFT after applying windowing to the frame units, iii) a log Mel-filter bank energy which divides the identified sound signal into preset frame units, and applies a Mel-filter bank and a log to a result of DFT after applying windowing to the frame units, and iv) a cepstrogram derived using a DCT coefficient derived by applying DCT to the log Mel-filter bank energy, a delta coefficient, and a delta-delta coefficient.

The number of components of a remaining sound signal feature parameter may be adjusted based on the number of components of a sound signal feature parameter preset for a frame interval to which the windowing is applied.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Hereinafter, the example embodiments will be described described in detail with reference to the accompanying drawings.

Figure 1:
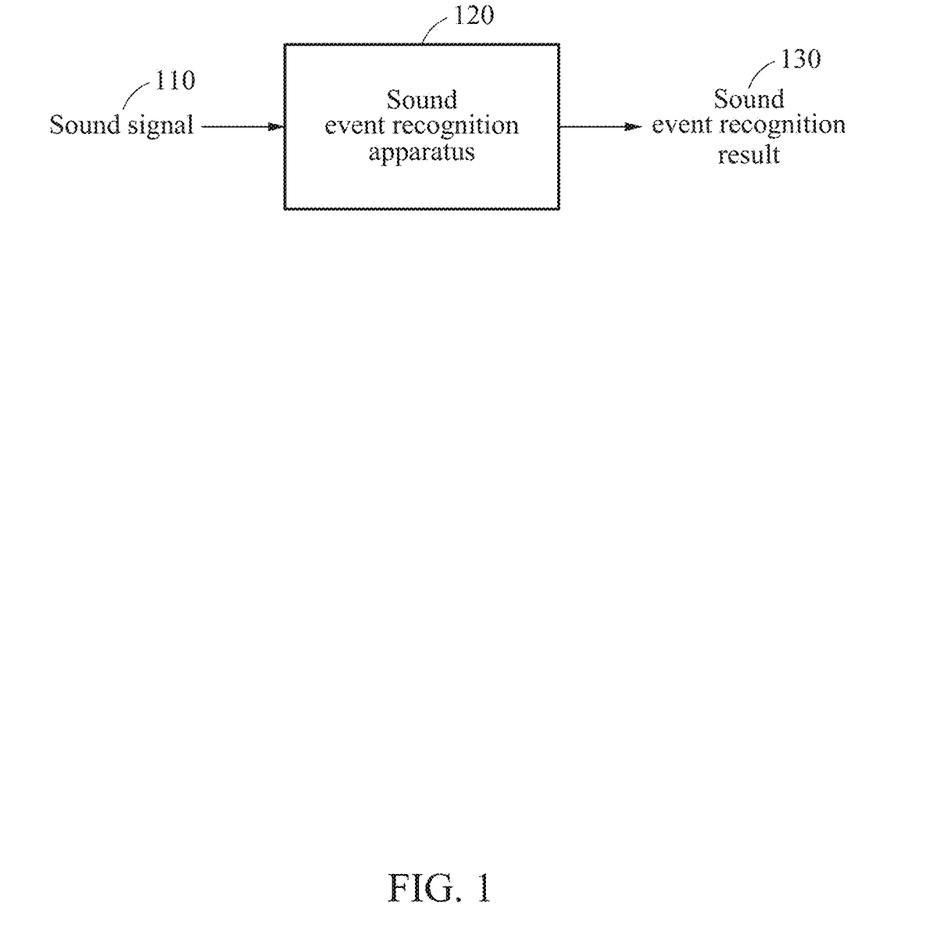
FIG. 1 is a diagram illustrating a process of recognizing a sound event using a neural network based on a sound signal feature parameter according to an example embodiment.

FIG. 1 is a diagram illustrating a process of recognizing a sound event using a neural network based on a sound signal feature parameter according to an example embodiment.

A sound signal 110 may include a sound event. The sound event may be a sound object which appears at a predetermined time and disappears, for example, a scream or a dog barking.

A sound event recognition apparatus 120 may extract at least one sound signal feature parameter from the sound signal 110. In this example, the sound event recognition apparatus 120 may extract the sound signal feature parameter including at least one of a log spectrogram, a log Mel-filter bank energy, a cepstrogram, and a scalogram through signal processing.

The sound event recognition apparatus 120 may use the extracted at least one sound signal feature parameter as an input for a convolutional neural network (CNN) to be applied to a sound event recognition method. In this example, the sound signal feature parameter may indicate various sound characteristics in a time-frequency domain. Thus, to use a correlation between different sound signal feature parameters, the entire CNN may be trained with respect to the correlation between the sound signal feature parameters, thereby effectively recognizing a sound event.

The sound event recognition apparatus 120 may output a sound event recognition result 130 of recognizing the sound event included in the sound signal 110. In this example, the sound event recognition apparatus 120 may display the sound event recognition result 130 using the extracted sound signal feature parameter and the trained CNN.

According to an example embodiment, a sound event included in a sound signal may be effectively recognized using a correlation between different sound signal feature parameters. Thus, the sound event recognition method performed by the sound event recognition apparatus 120 may be applied to various application fields such as the elderly and the infirm, the hearing-impaired, risk avoidance, facility security surveillance, and media auto-tagging.

Figure 2:
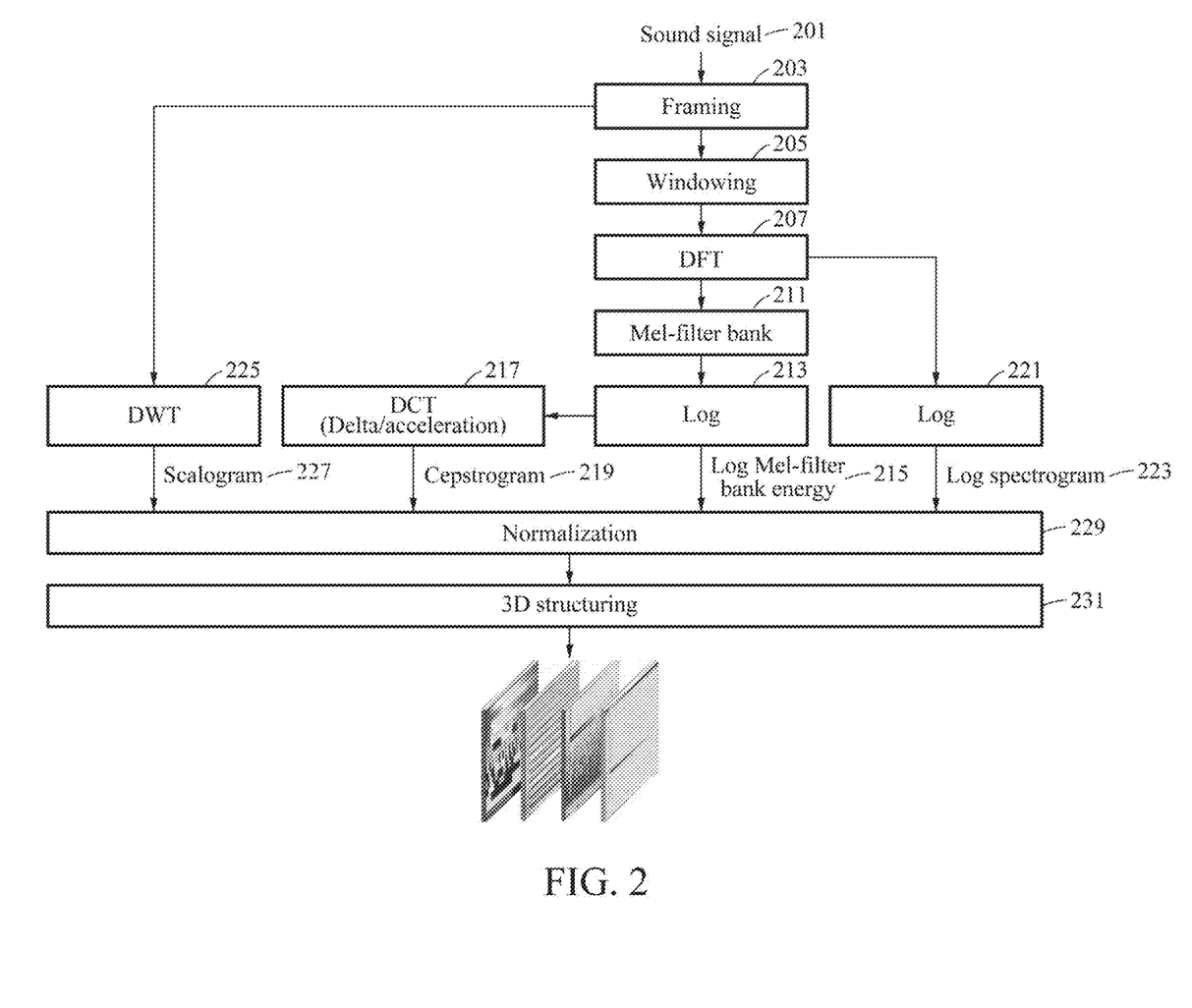
FIG. 2 is a diagram illustrating a process of extracting a sound signal feature parameter according to an example embodiment.
Figure 4:
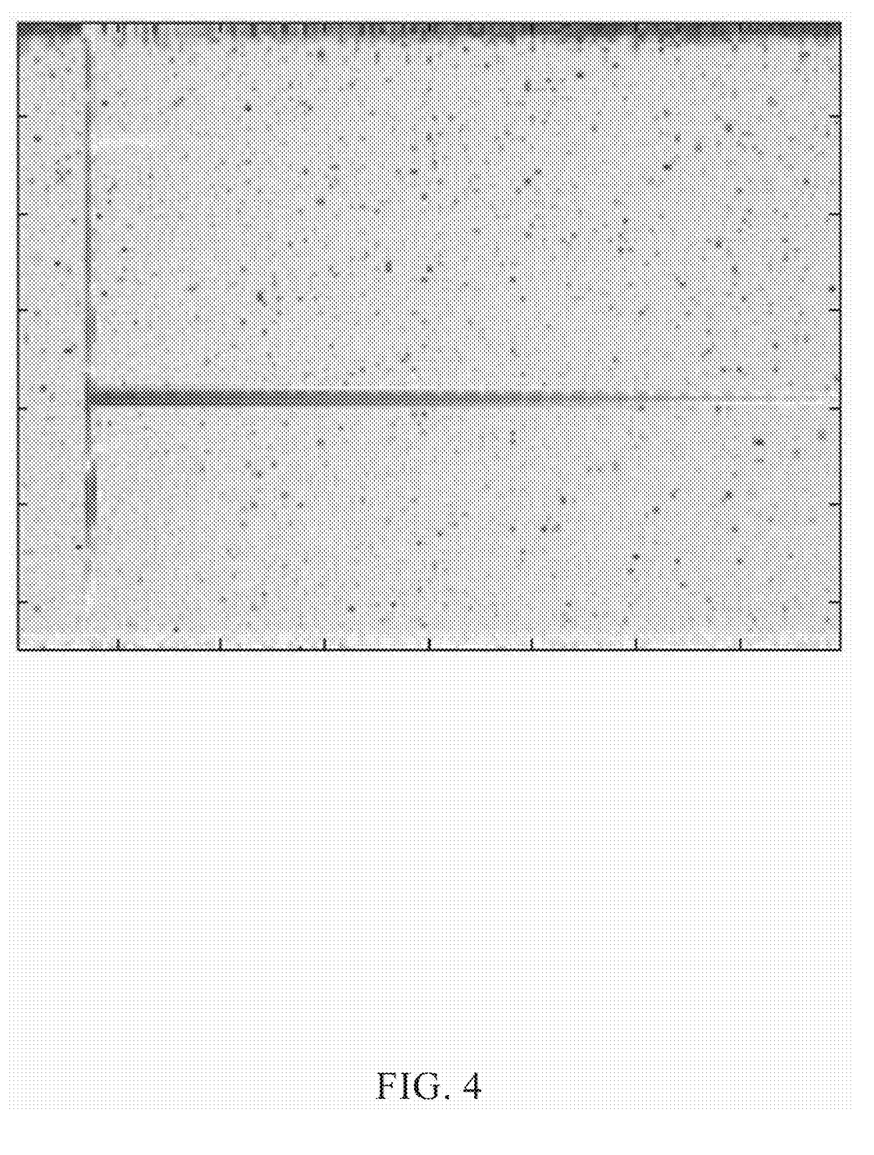
FIG. 4 illustrates a log spectrogram according to an example embodiment.
Figure 5:
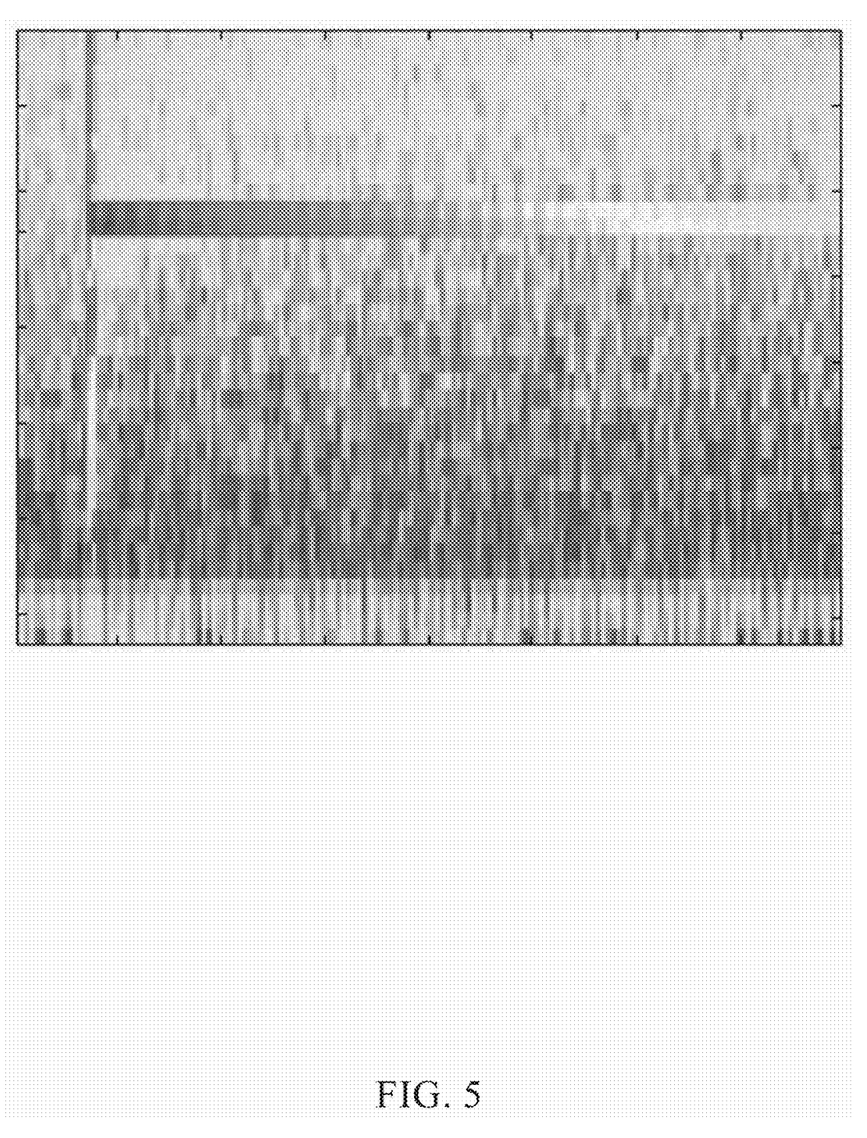
FIG. 5 illustrates a log Mel-filter bank energy according to an example embodiment.
Figure 6:
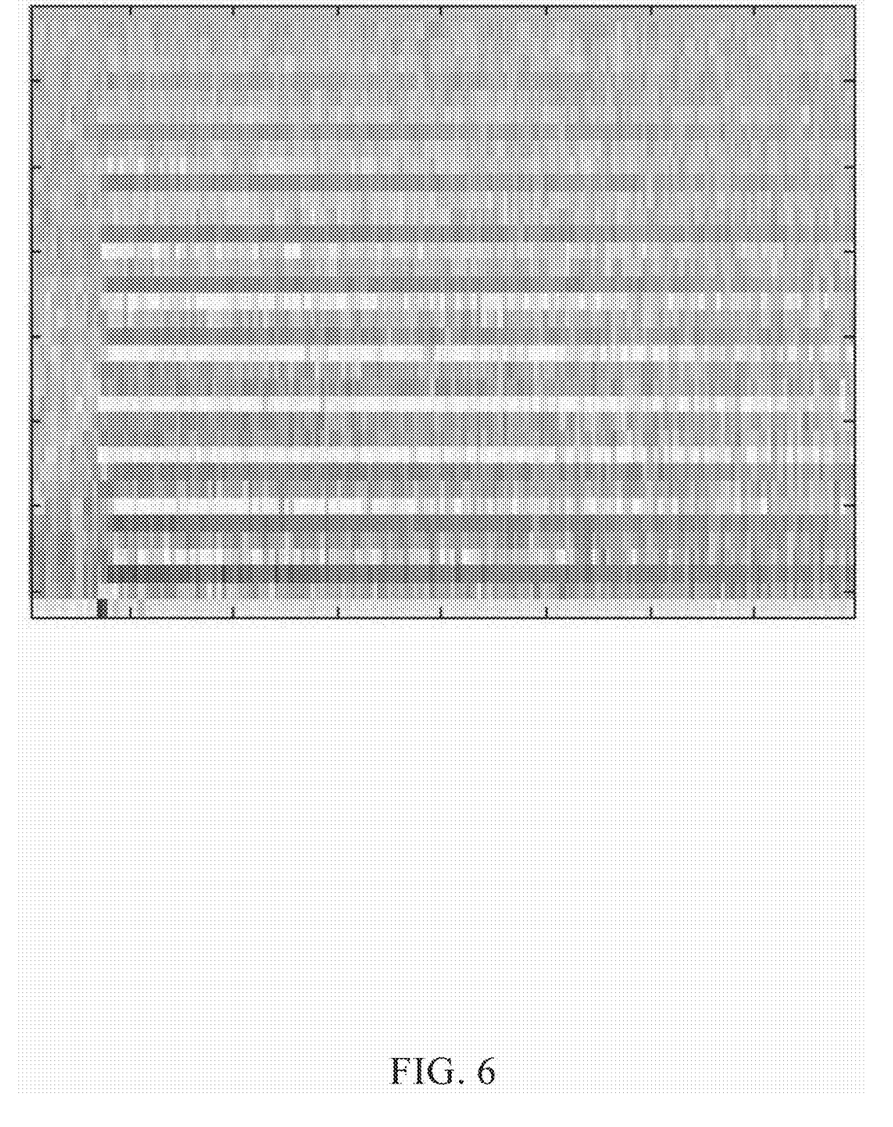
FIG. 6 illustrates a cepstrogram according to an example embodiment.
Figure 7:
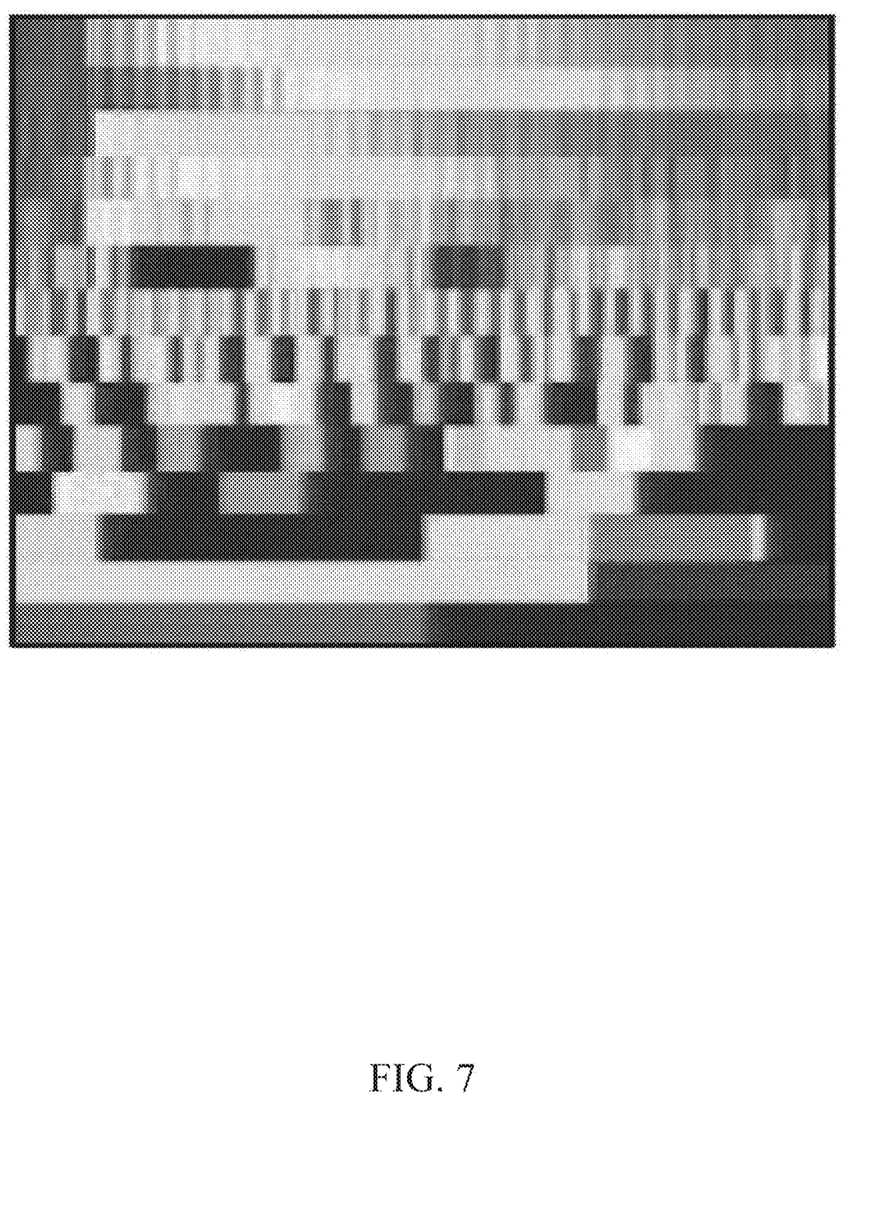
FIG. 7 illustrates a scalogram according to an example embodiment.

FIG. 2 is a diagram illustrating a process of extracting a sound signal feature parameter according to an example embodiment. A sound signal feature parameter may include a log spectrogram, a log Mel-filter bank energy, a cepstrogram, and a scalogram. In this example, FIG. 4 illustrates a log spectrogram according to an example embodiment, FIG. 5 illustrates a log Mel-filter bank energy according to an example embodiment, FIG. 6 illustrates a cepstrogram according to an example embodiment, and FIG. 7 illustrates a scalogram according to an example embodiment.

A sound signal 201 collected through a microphone may be divided into frame units to extract a sound signal feature parameter through framing 203, and the frame units may be set in advance. In this example, neighboring frames may overlap each other to detect a characteristic change in the sound signal between the neighboring frames.

Windowing 205 may be applied to the frame units of the sound signal 201. In this example, when the windowing 205 is applied, a signal discontinuity at both ends of a frame may decrease, whereby it is possible to prevent a leakage of a sidelobe which may occur when a discrete Fourier transform (DFT) 207 is applied.

If a log 221 is applied to a result of applying the DFT 207 after the windowing 205, a log spectrogram 223 may be extracted as the sound signal feature parameter. In detail, to represent a time variation for each frequency component with respect to the sound signal 201, the log spectrogram 223 may be obtained by applying a log of Equation 2 to a linear spectrogram of Equation 1 derived by applying the windowing 205 and the DFT 207 to samples of a preset frame interval. Here, the DFT 207 may be a short time Fourier transform (STFT). In this example, there may be a trade-off between a frequency resolution and a time resolution based on a length of the windowing 205. For example, when the length of windowing is increased to increase the frequency resolution, the time resolution may relatively decrease. Conversely, when the length of windowing is decreased to decrease the frequency resolution, the time resolution may relatively increase.

$$S_{lin}(f, t) = \left| \sum_{n=0}^{N-1} x_t[n] w[n] e^{-i2\pi \frac{f}{f_s} n} \right| \quad \text{[Equation 1]}$$

$$S'_{log}(f, t) = \log[S_{lin}(f, t)] \quad \text{[Equation 2]}$$

When a Mel-filter bank 211 and a log 213 are applied to the result of applying the DFT 207 after the windowing 205, a log Mel-filter bank energy 215 may be extracted as the sound signal feature parameter. In detail, the log Mel-filter bank energy 215 may consider a characteristic of a human auditory organ having a high-resolution sensitivity in a low frequency band and having a low-resolution sensitivity in a high frequency band. Thus, the log Mel-filter bank energy 215 is extracted by applying the log 213 to a frequency band-specific energy to which a Mel-filter bank of the following Equation 4, in which a Mel scale of the following Equation 3 is applied to the power spectrum of the STFT described above, is applied. In this example, the Mel-filter bank of Equation 4 may be a triangle Mel-filter bank. Here, $f_{mel}$ may indicate a frequency scale transformed into a Mel scale to reflect a characteristic of human hearing being more sensitive to a low frequency band than a high frequency band.

In Equation 4, k(1≤k≤K) denotes a frequency index when the DFT length is K. Further, a minimum frequency and a maximum frequency of the sound signal may be transformed into Mel scales, and the Mel scale intervals may be divided into M equal intervals corresponding to the number of filter banks to be analyzed. In this example, the frequency $f_m$ may be determined by inversely transforming a Mel scale based center frequency of the filter bank $H_m$ with a filter bank index of m(1≤m≤M) based on Equation 3, and f(m) may be a closest frequency index value mapped to $f_m$.

$$f_{mel} = 2595 * \log(1 + f/700) \quad [\text{Equation 3}]$$

$$H_m(k) = \begin{cases} 0 & k < f(m-1) \\ \frac{k - f(m-1)}{f(m) - f(m-1)} & f(m-1) \le k < f(m) \\ 1 & k = f(m) \\ \frac{f(m+1) - k}{f(m+1) - f(m)} & f(m) < k \le f(m+1) \\ 0 & k > f(m-1) \end{cases} \quad [\text{Equation 4}]$$

In this example, a Mel frequency cepstral coefficient (MFCC) based cepstrogram may be extracted as the sound signal feature parameter, based on a discrete cosine transform (DCT) coefficient obtained by applying a DCT 217 to the log Mel-filter bank energy 215, a delta coefficient, and a delta-delta coefficient. Thus, a cepstrogram 219 may indicate a change in the MFCC over time over time, unlike the log spectrogram 223 and the log Mel-filter bank energy 215 indicating a change in frequency component over time.

Further, a wavelet based scalogram 227 may be extracted as the sound signal feature parameter by applying a discrete wavelet transform (DWT) 225 to the frame units. In detail, unlike the STFT described above, the time resolution-frequency resolution may vary through a predetermined combination of a scaling factor a with respect to a mother wavelet Ψ and a time shift factor b of the following Equation 5. Thus, the wavelet based scalogram 227 may analyze multiple resolutions. For example, the mother wavelet Ψ may narrow on a time axis if a is greater than "1", and the mother wavelet Ψ may widen on the time axis if a is less than "1", whereby the resolution may be adjusted. Here, X(a,b) may indicate a continuous wavelet transform which may analyze signals of various time-frequency resolutions by adjusting the values of a and b, unlike the STFT having a single time-frequency resolution.

$$X(a,b) = \frac{1}{\sqrt{a}} \int_{-\infty}^{\infty} \overline{\Psi\left(\frac{t-b}{a}\right)} x(t) dt \quad [\text{Equation 5}]$$

The above sound signal feature parameters may have a sound characteristic axis (the axis y) which differs based on a time axis (the axis x) based on the same windowing interval. Thus, the numbers of components of the sound signal feature parameters may not be the same. When inputting the extracted sound signal feature parameter into a neural network to effectively recognize a sound event using a correlation between different sound signal feature parameters, the numbers of components with respect to the sound characteristic axis may need to be the same. To achieve the foregoing, the numbers of components of remaining sound signal feature parameters may be adjusted to be the same based on one of the sound signal feature parameters extracted by the frequency resolution. For example, based on the number of components of the log spectrogram being a sound signal feature parameter, the numbers of components of the log Mel-filter bank energy, the cepstrogram, and the scalogram being the remaining sound signal feature parameters may be adjusted to be the same.

In detail, to adjust the number of components of the log Mel-filter bank energy being a remaining sound signal feature parameter, $f_{mel}$ may be determined by substituting ½ of a sampling frequency with respect to the sound signal from Equation 3. Then, the center frequency f(m) of each Mel-filter bank may be determined through Equation 4, in an interval linearly divided from "0" to $f_{mel}$ corresponding to the number of components of the log spectrogram. In this example, the value of m may correspond to the number of Mel-filter banks, which is the same as the number of components of the log spectrogram.

Further, the number of components of the MFCC based cepstrogram being a remaining sound signal feature parameter may be adjusted to be the same as the number of components of the log spectrogram through the following process. In detail, the cepstrogram may use only a portion of DCT coefficients having a relatively significant effect on the sound event recognition performance, rather than using all the DCT coefficients obtained through DCT. In this example, the number of components of the cepstrogram may not be the same as the number of components of the log spectrogram. To solve this, the delta coefficient and the delta-delta or acceleration coefficient may be added. The delta coefficient $d_t$ may be determined through the following Equation 6. In Equation 6, $C_t$ denotes a DCT coefficient in a time frame t, and N denotes a degree of change between DCT coefficients of the past (t−n) and the future (t+n) based on the current time frame t while varying a time frame interval n for obtaining the delta coefficient from "1" to "N".

$$d_t = \frac{\sum_{n=1}^{N} n(c_{t+n} - c_{t-n})}{2\sum_{n=1}^{N} n^2} \quad [\text{Equation 6}]$$

$$dd_t = \frac{\sum_{n=1}^{N} n(d_{t+n} - d_{t-n})}{2\sum_{n=1}^{N} n^2} \quad [\text{Equation 7}]$$

The delta-delta coefficient $dd_t$ may be determined through Equation 7. Here, $d_t$ denotes a delta coefficient in the time frame interval t, and indicates a degree of change in the MFCC in a predetermined time frame interval N. Further, the delta-delta coefficient may also be calculated in the same manner using the delta coefficient of Equation 6, and indicate a degree of change in the delta value. Thus, by setting the number of components of each of the DCT coefficient, the delta coefficient, and the delta-delta coefficient to ⅓ of the number of components of the log spectrogram, or by setting the number of components of a combination of the coefficients (for example, a combination of the DCT coefficient and the delta coefficient or a combination of the DCT coefficient and the delta-delta coefficient) to ½ of the number of components of the log spectrogram, the number of components of the cepstrogram may be adjusted to be the same as the number of components of the log spectrogram.

Further, by selecting a portion of DWT coefficients obtained through DWT, the portion corresponding to the number of components of the log spectrogram, the number of components of the wavelet based scalogram being a remaining sound signal feature parameter may be adjusted to be the same as the number of components of the log spectrogram.

The scalogram 227, the cepstrogram 219, the log Mel-filter bank energy 215, and the log spectrogram 223 extracted as the sound signal feature parameters x may be processed through a normalization 229 using an average $\bar{x}$ and a standard deviation σ based on Equation 8, and output in a three-dimensional (3D) structure 231.

$$x' = \frac{x - \bar{x}}{\sigma} \quad \text{[Equation 8]}$$

Figure 3:
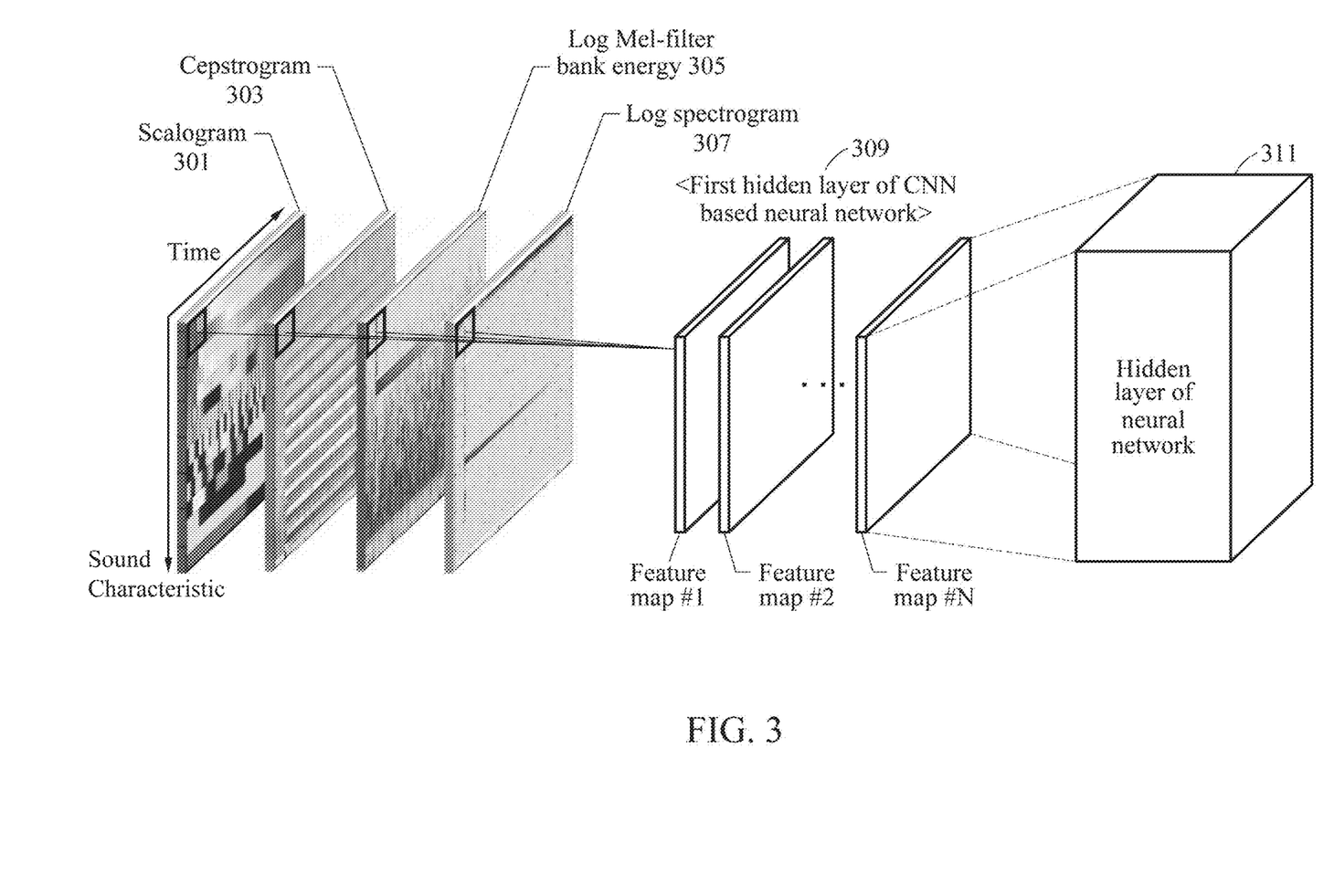
FIG. 3 is a diagram illustrating a structure for processing a sound signal feature parameter according to an example embodiment.

FIG. 3 is a diagram illustrating a structure for processing a sound signal feature parameter according to an example embodiment.

Sound signal feature parameters 301, 303, 305, and 307 of FIG. 3 may have scales of the same time axis and the same sound characteristic axis. That is, the number of components of the sound signal feature parameters 301, 303, 305, and 307 with respect to the sound characteristic axis may be adjusted to be the same through the process described above.

As shown in FIG. 3, a first hidden layer of a CNN based neural network may include a feature map #1, a feature map #2 through a feature map # N. In this example, the number of kernels or filters of the CNN may be the same as N which is the number of feature maps. Here, the feature map #1 may be configured by combining results of applying a first filter to the sound signal feature parameters 301, 303, 305, and 307. Further, the feature map #2 may be configured by combining results of applying a second filter to the sound signal feature parameters 301, 303, 305, and 307. Similarly, the feature map # N may be configured by combining results of applying an N-th filter to the sound signal feature parameters 301, 303, 305, and 307.

A first hidden layer 309 including the feature map #1 through feature map # N configured by combining the respective filters to the sound signal feature parameters 301, 303, 305, and 307 may transmit a related result to a hidden layer 311 of the neural network.

Training may be performed from the first hidden layer of the neural network using a correlation of the different sound signal feature parameters 301, 303, 305, and 307, and thus the performance of recognizing a sound event included in a sound signal may improve.

Figure 8:
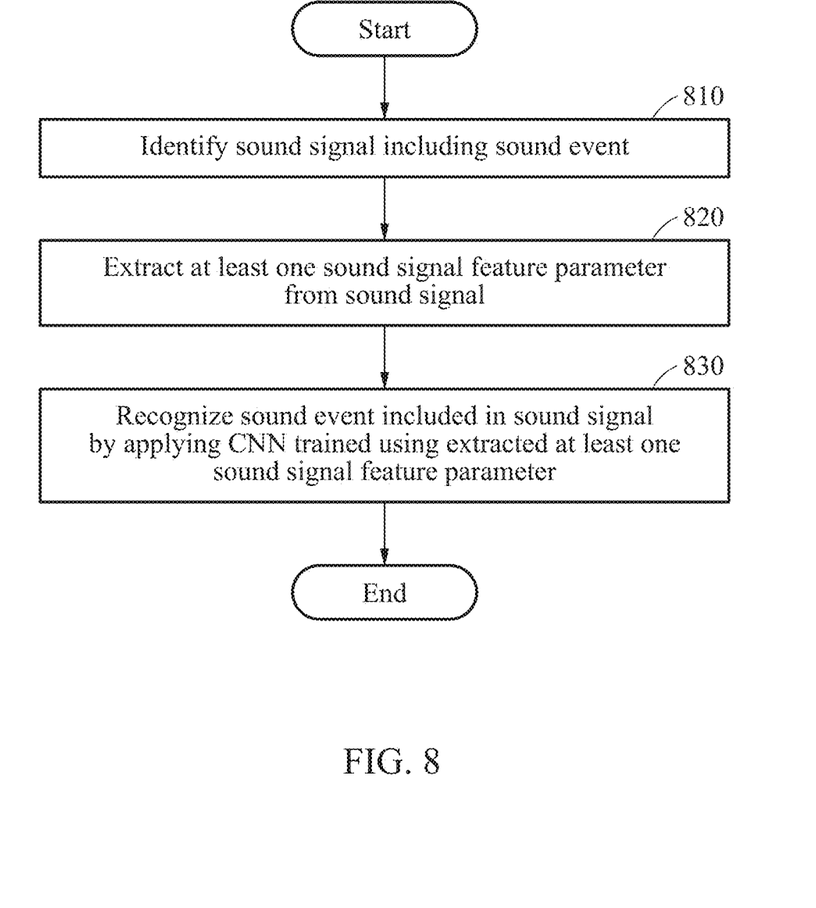
FIG. 8 illustrates a sound event recognition method performed by a sound event recognition apparatus according to an example embodiment.

FIG. 8 illustrates a sound event recognition method performed by a sound event recognition apparatus according to an example embodiment. A CNN may be trained by a training apparatus, and the trained CNN may be applied to a sound event recognition apparatus for sound event recognition.

In operation 810, the sound event recognition apparatus may identify a sound signal including a sound event. In this example, the sound event may be a sound entity which appears at a predetermined time and disappears.

In operation 820, the sound event recognition apparatus may extract at least one sound signal feature parameter from the sound signal. The at least one sound signal feature parameter may include a log spectrogram, a log Mel-filter bank energy, a cepstrogram, and a scalogram.

For example, the at least one sound signal feature parameter may be a scalogram which divides the identified sound signal into preset frame units, and applies a discrete wavelet transform (DWT) to the frame units.

The at least one sound signal feature parameter may be a log spectrogram which divides the identified sound signal into preset frame units, and applies a log to a result of DFT after applying windowing to the frame units. In this example, the log spectrogram may have a trade-off relationship between a frequency resolution and a time resolution based on a length of the windowing.

The at least one sound signal feature parameter may be a log Mel-filter bank energy which divides the identified sound signal into preset frame units, and applies a Mel-filter bank and a log to a result of DFT after applying windowing to the frame units. In this example, the Mel-filter bank may apply a Mel scale to the result of DFT in view of a different resolution depending on a frequency.

The at least one sound signal feature parameter may be a cepstrogram derived using a DCT coefficient derived by applying DCT to the log Mel-filter bank energy, a delta coefficient, and a delta-delta coefficient.

Here, the number of components of a remaining sound signal feature parameter may be adjusted to be the same based on the number of components of a sound signal feature parameter preset for a frame interval to which the windowing is applied. In detail, the number of components of the remaining sound signal feature parameters (the log Mel-filter bank energy, the cepstrogram, and the scalogram) with respect to the sound characteristic axis may be adjusted to be the same as the number of components of the log spectrogram with respect to the sound characteristic axis.

In operation 830, the sound event recognition apparatus may recognize the sound event included in the sound signal by applying a CNN trained using the extracted at least one sound signal feature parameter.

In this example, the CNN may include hidden layers, and an output layer. A first hidden layer may include at least one feature map generated based on the at least one sound signal feature parameter extracted from the sound signal including the sound event and normalized. Then, the training may be performed through another hidden layer connected to the first hidden layer, and the entire neural network may be trained using a correlation between sound signal feature parameters.

According to example embodiments, a sound event recognition method may improve a sound even recognition performance using a correlation between different sound signal feature parameters based on a neural network.

According to example embodiments, a sound event recognition method may use feature parameters of a three-dimensional structure generated through signal processing of different sound signal feature parameters, as an input for a neural network.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for recognition of sound events based on a convolutional neural network (CNN), the method comprising:
    identifying a sound signal including a sound event;
    extracting plurality of sound signal feature parameters from the sound signal; and
    recognizing the sound event included in the sound signal by applying a CNN trained using the extracted plurality of sound signal feature parameters,
    wherein the CNN is trained through a first hidden layer including at least one feature map generated by normalizing the extracted plurality of sound signal feature parameters, and
    wherein the number of components of a remaining sound signal feature parameter is adjusted based on the number of components of a sound signal feature parameter preset for a frame interval to which a windowing is applied of sound signal.

2. The method of claim 1, wherein the plurality of sound signal feature parameters are a scalogram which-divides the identified sound signal into preset frame units, and applies a discrete wavelet transform (DWT) to the frame units.

3. The method of claim 1, wherein the plurality of sound signal feature parameters are a log spectrogram which divides the identified sound signal into preset frame units, and applies a log to a result of discrete Fourier transform (DFT) after applying windowing to the frame units.

4. The method of claim 3, wherein the log spectrogram has a trade-off relationship between a frequency resolution and a time resolution based on a length of the windowing.

5. The method of claim 1, wherein the plurality of sound signal feature parameters are a log Mel-filter bank energy which divides the identified sound signal into preset frame units, and applies a Mel-filter bank and a log to a result of DFT after applying windowing to the frame units, and
    the Mel-filter bank applies a Mel scale to the result of DFT in view of a different resolution depending on a frequency.

6. The method of claim 5, wherein the plurality of sound signal feature parameters are a cepstrogram is derived using a discrete cosine transform (DCT) coefficient derived by applying DCT to the log Mel-filter bank energy, a delta coefficient, and a delta-delta coefficient.

7. A method of training a convolutional neural network (CNN) to be applied to a sound event recognition method, the method comprising:
    normalizing a plurality of sound signal feature parameters extracted from a sound signal including a sound event; and
    training a CNN through a first hidden layer including at least one feature map generated based on the normalized sound signal feature parameter,
    wherein the number of components of a remaining sound signal feature parameter is adjusted based on the number of components of a sound signal feature parameter preset for a frame interval to which a windowing is applied of sound signal.

8. The method of claim 7, wherein the plurality of sound signal feature parameters includes
   i) a scalogram which divides the identified sound signal into preset frame units, and applies a discrete wavelet transform (DWT) to the frame units,
   ii) a log spectrogram which divides the identified sound signal into preset frame units, and applies a log to a result of discrete Fourier transform (DFT) after applying windowing to the frame units,
   iii) a log Mel-filter bank energy which divides the identified sound signal into preset frame units, and applies a Mel-filter bank and a log to a result of DFT after applying windowing to the frame units, and
   iv) a cepstrogram derived using a discrete cosine transform (DCT) coefficient derived by applying DCT to the log Mel-filter bank energy, a delta coefficient, and a delta-delta coefficient.

9. A sound event recognition apparatus to which a convolutional neural network (CNN) is applied, the sound event recognition apparatus comprising:
   a processor and a memory including computer-readable instructions,
   wherein, when the instructions are executed by the processor, the processor is configured to identify a sound signal including a sound event, extract a plurality of sound signal feature parameters from the sound signal, and recognize the sound event included in the sound signal by applying a CNN trained using the extracted plurality of sound signal feature parameters,
   wherein the CNN is trained through a first hidden layer including at least one feature map generated by normalizing the extracted plurality of sound signal feature parameters, and
   wherein the number of components of a remaining sound signal feature parameter is adjusted based on the number of components of a sound signal feature parameter preset for a frame interval to which the windowing is applied.

10. The sound event recognition apparatus of claim 9, wherein the plurality of sound signal feature parameters are a scalogram which divides the identified sound signal into preset frame units, and applies a discrete wavelet transform (DWT) to the frame units.

11. The sound event recognition apparatus of claim 9, wherein the plurality of sound signal feature parameters are a log spectrogram which divides the identified sound signal into preset frame units, and applies a log to a result of discrete Fourier transform (DFT) after applying windowing to the frame units.

12. The sound event recognition apparatus of claim 11, wherein the log spectrogram has a trade-off relationship between a frequency resolution and a time resolution based on a length of the windowing.

13. The sound event recognition apparatus of claim 9, wherein the plurality of sound signal feature parameters are a log Mel-filter bank energy which divides the identified sound signal into preset frame units, and applies a Mel-filter bank and a log to a result of DFT after applying windowing to the frame units, and
   the Mel-filter bank applies a Mel scale to the result of DFT in view of a different resolution depending on a frequency.

14. The sound event recognition apparatus of claim 13, wherein the plurality of sound signal feature parameters are a cepstrogram derived using a discrete cosine transform (DCT) coefficient derived by applying DCT to the log Mel-filter bank energy, a delta coefficient, and a delta-delta coefficient.

* * * * *